J. K. MINICH.
Harrow and Cultivator.
No. 54,648. Patented May 8, 1866.
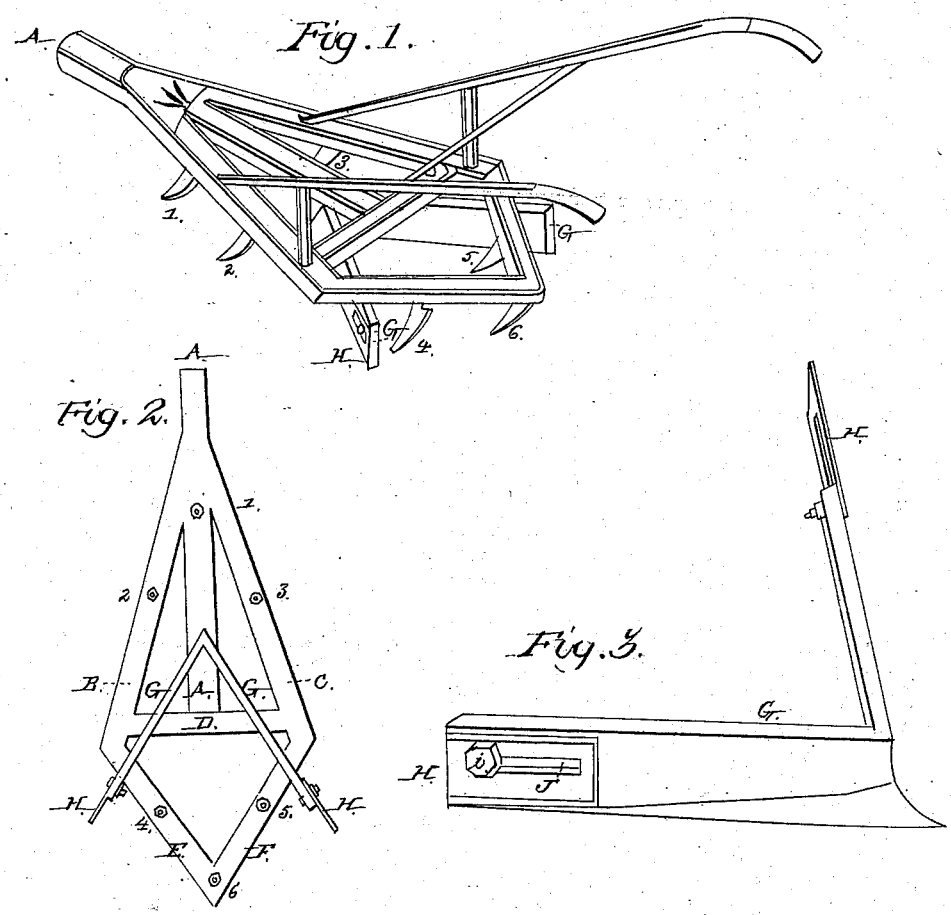

UNITED STATES PATENT OFFICE.

JACOB K. MINICH, OF MOUNT JOY, PENNSYLVANIA, ASSIGNOR TO HIMSELF AND JACOB R. HOFFER, OF SAME PLACE.

IMPROVEMENT IN HARROW AND CULTIVATOR COMBINED.

Specification forming part of Letters Patent No. 54,648, dated May 8, 1866; antedated September 25, 1865.

*To all whom it may concern:*

Be it known that I, JACOB K. MINICH, of the borough of Mount Joy, in the county of Lancaster and State of Pennsylvania, have invented a new and useful Improvement on a Combined Cultivator and Double-Shovel Harrow; and I do hereby declare that the following is a full, clear, and exact description of the construction and operation of the same, reference being had to the accompanying drawings, making a part of this specification, in which—

Figure 1 is a perspective view; Fig. 2, a plan view; Fig. 3, the detached cultivator G, showing its slotted side wings, H H.

The nature of my invention consists in providing a single instrument of husbandry to perform in one operation the same labor usually performed by two distinct implements in three separate operations—namely, to break the soil by the anterior shovels, 1 2 3, and loosen it ready for the operation of the central cultivator or scraper, G, which latter may be widened by extending the side wings, H, by means of the bolt-head I and slot J, so as to adapt it to furrows of more than the ordinary width, and hence adjustable. In the meantime, after the soil is thus prepared, the rear shovels, 4 5 6, draw the furrows ready for sowing turnips, kale, or the like between the ranks of Indian corn, as well as to prepare the soil for corn or working it afterward, as set forth.

To effect this object I construct the fore part of my harrow in the usual form by framing A B C D, as shown, bearing three shovels, 1 2 3. Back of these is my two-winged cultivator G. On the end of each wing is an additional plate, H, having a slot, *j*, and held in place by a headed bolt, I, by which the wings may be extended on each side and adjusted to the width between the rows of corn or furrows. To the front portion of the frame A B C D, I attach the pieces E F, meeting in a point at the rear, on which pieces are three other shovels, 4, 5, and 6, as shown, which perform their office in the rear of the cultivator G and prepare the furrows ready for planting or sowing.

The drawings clearly show the construction and arrangement of the several parts, and their operation will be readily understood by all familiar with the use of the shovel harrow and cultivator, and this arrangement is deemed both novel and highly useful by competent judges, and considered a desirable implement on the farm.

The latter portion or parts E F, with its shovels, as well as the cultivator G, with its side wings, H, may be applied to the ordinary shovel-harrow, or so constructed that it may also be manufactured to be used simply as a common shovel-harrow, or united into one, forming the combination of the double-shovel harrow and cultivator, as shown.

I am aware that there are numerous devices and improvements where the shovels and cultivators are used, and that these in themselves present no novelty; but I am not aware that any are substantially so arranged with adjustable side wings for regulating the spread and performing a double office in the manner set forth in one and the same operation.

What I claim as my invention, and desire to secure by Letters Patent, is—

The construction and arrangement of the shovels 1 2 3 and 4 5 6, in combination with the cultivator G and its slotted side wings, H, all arranged and operating in the manner and for the purpose specified.

JACOB K. MINICH.

Witnesses:
C. B. ENGLE,
JAS. A. PATTERSON.